(12) United States Patent
Watanabe

(10) Patent No.: US 7,450,298 B2
(45) Date of Patent: Nov. 11, 2008

(54) OPTICAL SIGNAL WAVEFORM SHAPING APPARATUS

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/520,727

(22) Filed: Sep. 14, 2006

(65) Prior Publication Data

US 2007/0230518 A1    Oct. 4, 2007

(30) Foreign Application Priority Data

Mar. 28, 2006   (JP)   .............................. 2006-089434

(51) Int. Cl.
*G02F 1/39*   (2006.01)
*H04B 10/17*   (2006.01)
(52) U.S. Cl. ....................... 359/333; 398/174; 398/175; 398/177; 359/330
(58) Field of Classification Search ................. 359/333, 359/344, 330; 398/174, 175, 177
See application file for complete search history.

(56) References Cited

U.S. PATENT DOCUMENTS

| | | | | |
|---|---|---|---|---|
| 5,400,164 | A * | 3/1995 | Kurtzke et al. | ............... 398/150 |
| 5,798,853 | A * | 8/1998 | Watanabe | .................... 398/150 |
| 6,344,921 | B1 * | 2/2002 | Galvanauskas et al. | ..... 359/332 |
| 6,453,082 | B1 | 9/2002 | Watanabe | |
| 6,477,300 | B2 | 11/2002 | Watanabe et al. | |
| 6,501,591 | B1 * | 12/2002 | Kumar et al. | ................ 359/330 |
| 6,608,854 | B1 | 8/2003 | Watanabe | |
| 6,717,718 | B1 | 4/2004 | Kelsoe et al. | |
| 6,853,774 | B2 | 2/2005 | Watanabe | |
| 6,963,436 | B2 | 11/2005 | Watanabe et al. | |
| 7,043,099 | B1 | 5/2006 | Watanabe | |
| 2004/0190121 | A1 * | 9/2004 | Popov et al. | ................. 359/337 |
| 2005/0111802 | A1 * | 5/2005 | Lee et al. | ..................... 385/123 |
| 2005/0206997 | A1 * | 9/2005 | Hubbard | ...................... 359/330 |
| 2007/0211252 | A1 * | 9/2007 | Futami et al. | ............... 356/364 |

FOREIGN PATENT DOCUMENTS

| | | |
|---|---|---|
| EP | 1582915 A2 | 10/2005 |
| JP | A-H07-098464 | 4/1995 |
| JP | A-H08-171102 | 7/1996 |
| JP | A-H10-232415 | 9/1998 |
| JP | A-2000-75330 | 3/2000 |
| JP | A-2000-323786 | 11/2000 |

(Continued)

OTHER PUBLICATIONS

Chestnut et al., "High-power 1664.7 nm fiber source based on Raman and Parametric Gain", Lasers and Electro-Optics, 2002, CLEO '02. Technical Digest. p. 569.*

(Continued)

*Primary Examiner*—Eric Bolda
(74) *Attorney, Agent, or Firm*—Hanify & King, PC

(57) ABSTRACT

An optical signal and pump light are input to a nonlinear optical medium. In the nonlinear optical medium, the optical signal is amplified with a nonlinear effect caused by the pump light. A monitor circuit monitors parametric gain in the nonlinear optical medium. A first power controller increases input power of the optical signal so that the gain reaches saturation. A second power controller controls input power of the pump light so as to obtain a desired gain.

35 Claims, 15 Drawing Sheets

FOREIGN PATENT DOCUMENTS

| | | |
|---|---|---|
| JP | A-2001-117125 | 4/2001 |
| JP | A-2001-249371 | 9/2001 |
| JP | A-2003-107541 | 4/2003 |
| JP | A-2003-209516 | 7/2003 |
| JP | B2-3461121 | 10/2003 |
| JP | B2-3472151 | 12/2003 |
| WO | WO98/08138 | 2/1998 |

OTHER PUBLICATIONS

Marhic et al. "Broadband fiber optical parametric amplifiers", Optics Letters, vol. 21, No. 8, pp. 573-575, (Apr. 15, 1996).*

S. Watanabe, et al., "Novel Fiber Kerr-Switch with Parametric Gain: Demultiplexing and Sampling up to 640 Gb/s," *ECOC 2004 30th European Conference on Optical Communication*, 2004.

Giorgio M. Tosi-Beleffi, Franco Curti, Davide M. Forin, Francesco Matera, Michele Guglielmucci; *10 Gbit/s All-Optical 2R Fiber Based Regeneration*; Mar. 2004; pp. 323-327.

D.M. Forin, F. Curti, G.M. Tosi Beleffi, F. Matera, Michele Guglielmuci; *All Optical Fibre Auxiliary Carrier Based 2R Regenerator*; Jun. 2005; pp. 537-539.

Extended European search report; dated Dec. 28, 2007; Application No. 060119045.1-1246; Reference No. 117 274 a/fha; 9-pages.

* cited by examiner

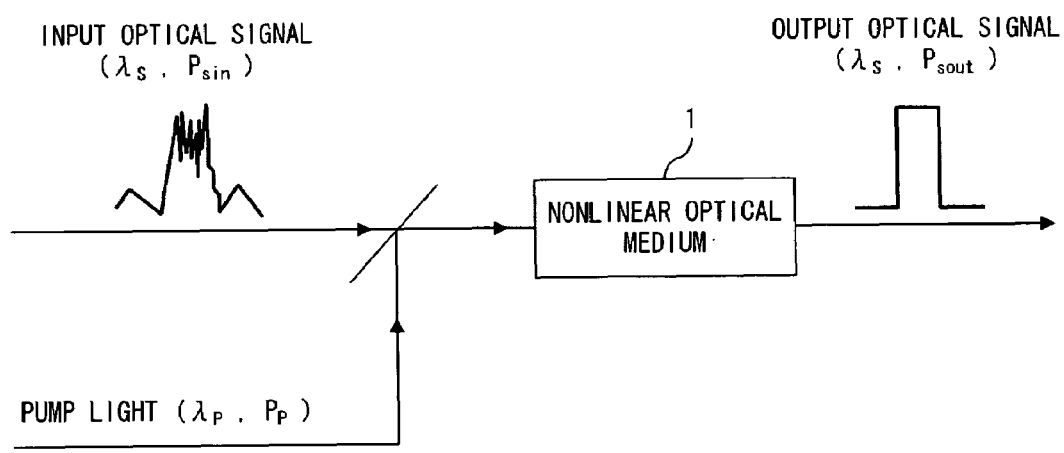
F I G. 1

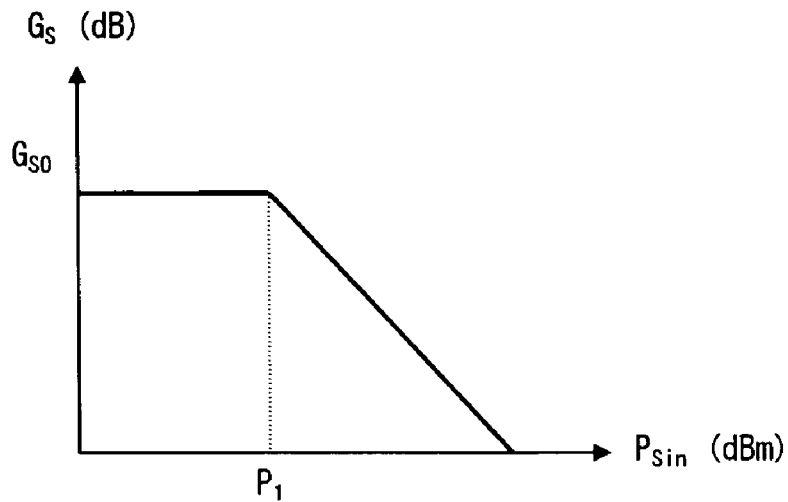
F I G. 4A
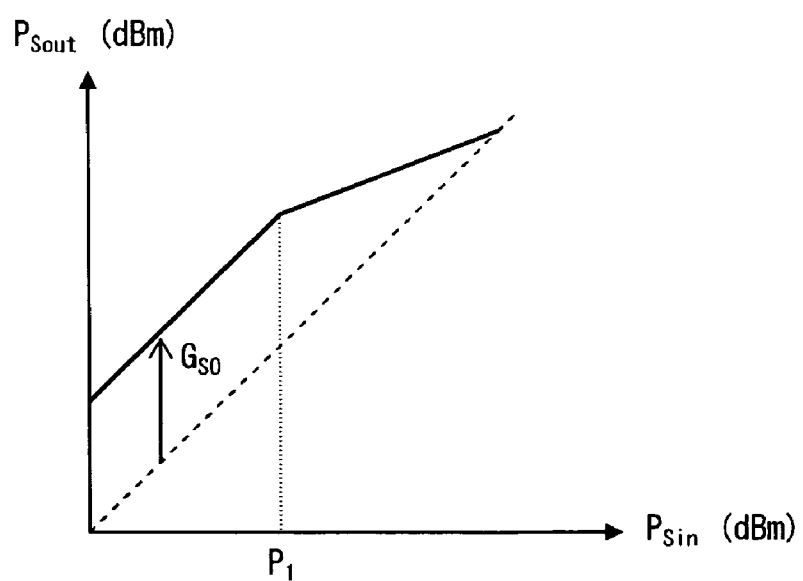
F I G. 4B

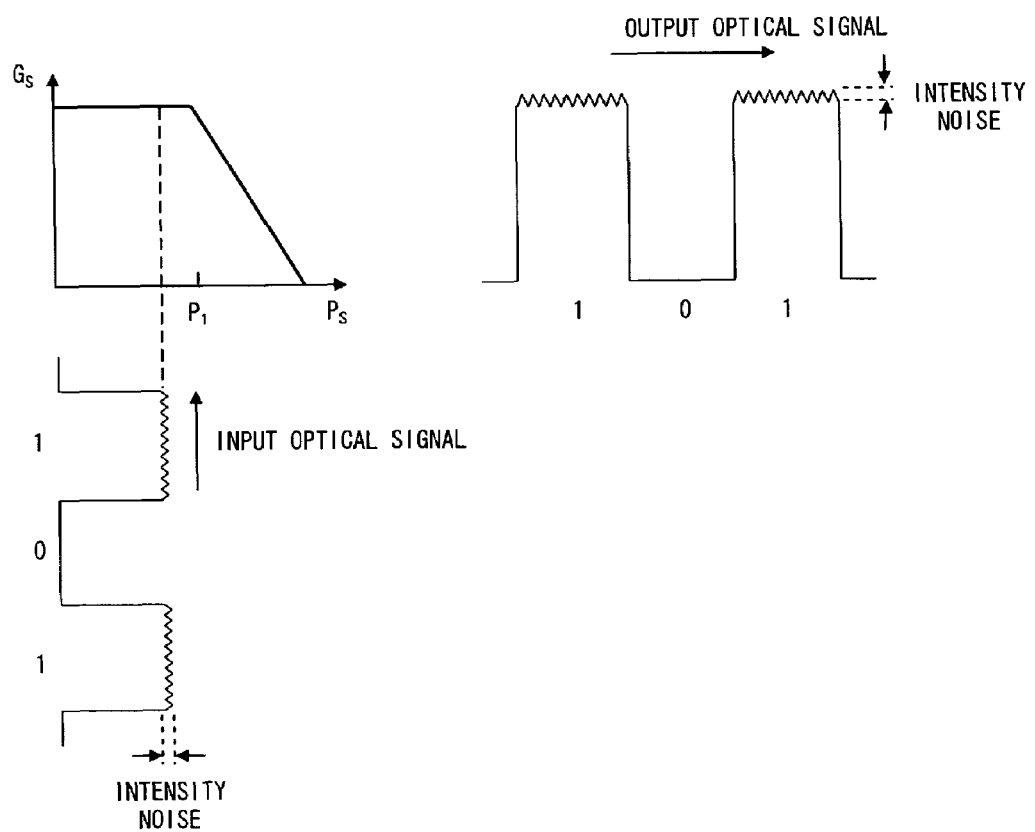
F I G. 5

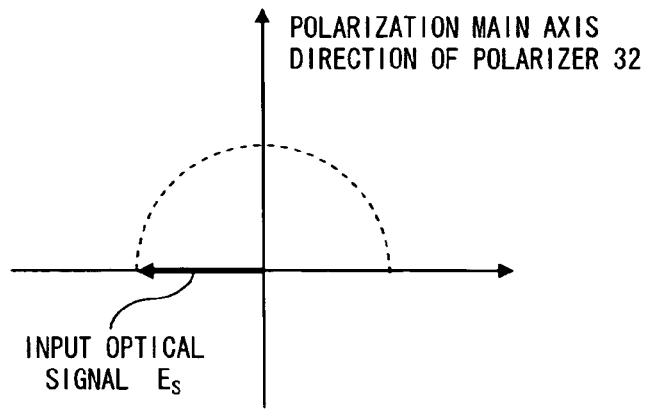
F I G. 8A
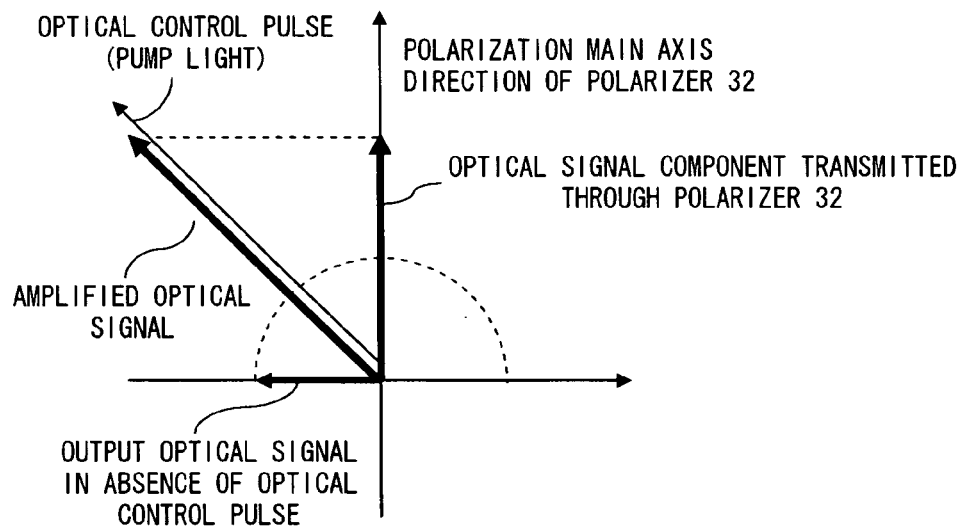
F I G. 8B
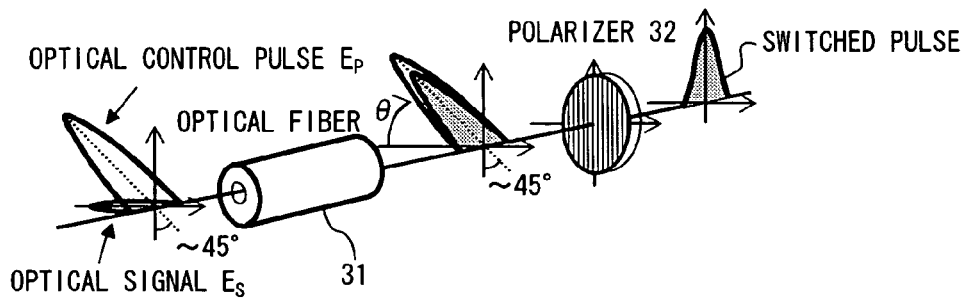
F I G. 8C

OPTICAL SIGNAL WAVEFORM SHAPING APPARATUS

BACKGROUND OF THE INVENTION

1. Field of the Invention

The present invention relates to a waveform shaping apparatus for, among other purposes, shaping a waveform of an optical signal being degraded by for example transmission in an optical fiber.

2. Description of the Related Art

In conventional optical communication systems, the accuracy of the chromatic dispersion control of a transmission optical fiber and the characteristics of an optical amplifier amplifying an attenuated optical signal are primary factors which determine the limits of transmission speed (bitrate of data) and transmission distance. A configurations using a transmission line with an alternating arrangement of a normal dispersion fiber and an anomalous dispersion fiber or a configuration using a chromatic dispersion compensator (such as a dispersion compensation fiber) are well-known technologies for compensating for waveform distortion caused by long distance transmission. An optical amplifier (e.g., an optical fiber amplifier) compensates for attenuation of signal optical power caused by loss in a transmission fiber.

Transoceanic systems (e.g. a submarine cable connecting continents) employing a single wavelength transmission of 10 Gigabit per second (10 Gb/s) or WDM transmission have been developed, however, there is a current trend of increasing demand for realizing long distance transmission of high-speed optical signals (i.e., 40 Gb/s through 160 Gb/s and higher). However, even with the combination of highly accurate dispersion compensation technology and a high-quality optical amplifier, optical S/N ratio is deteriorated by remaining waveform distortion or Amplified Spontaneous Emission (ASE) noise added by the optical amplifier in the existing technologies. For that reason, the actual transmission distance is limited to several hundred kilometers for transmission speeds of 40 Gb/s, and to only a few kilometers for transmission speeds of 160 Gb/s.

Thus, in order to realize a long distance optical fiber transmission at the high speeds described above, a technology to shape a distorted waveform and a technology to suppress the accumulated ASE noise are required.

Patent Document 1 (Japan Patent 3461121) and Patent Document 2 (Japan Patent 3472151) describe a circuit for shaping a waveform of an optical signal by employing an optical limiter function. In the circuits described in the above Patent Documents, a signal light beam and an auxiliary light beam are inputted to an optical fiber. Four-wave mixing occurs when optical power of the signal light beam is higher than a threshold level. In the four-wave mixing, a portion of the power of the signal light beam is transferred to the auxiliary light beam, and the power of the signal light beam is then reduced. By so doing, noise of level "1" of an optical signal is suppressed, and its waveform is shaped.

However, although the technologies described in the Patent Document 1 and the Patent Document 2 have, to a certain extent, a waveform shaping effect, it is not necessarily sufficient and can be improved.

SUMMARY OF THE INVENTION

It is an object of the present invention to provide an optical waveform shaping apparatus for efficiently shaping a waveform of a degraded optical signal.

An optical waveform shaping apparatus comprises a first power controller controlling the power of an optical signal, a second power controller controlling the power of pump light having a wavelength different from the wavelength of the optical signal, and a nonlinear optical medium into which the optical signal with power controlled by the first power controller and the pump light with power controlled by the second power controller are inputted. The first power controller controls the power of the optical signal so that the gain of parametric amplification caused by the pump light is saturated in the nonlinear optical medium.

The optical signal is parametrically amplified by the pump light in the nonlinear optical medium. However, if the input power of the optical signal is increased, the pump light power is consumed in order to generate four-wave mixing, and the parametric gain reaches saturation. This saturation enables the realization of the optical limiter function and suppresses the "1" level noise of the optical signal.

The optical waveform shaping apparatus may further comprise a saturable absorber in a previous stage or a subsequent stage of the nonlinear optical medium. Using the saturable absorber, "0" level noise of the optical signal can be suppressed.

According to the present invention, it is possible to provide an optical waveform shaping apparatus for efficiently shaping the waveform of a degraded optical signal. Through the use of the optical waveform shaping apparatus of the present invention in an optical communication system, communication quality may be improved (e.g., improving the optical signal-to-noise (S/N) ratio).

BRIEF DESCRIPTION OF THE DRAWINGS

FIG. 1 is a diagram illustrating an operation principle of an optical waveform shaping apparatus of the present invention;

FIG. 4A and FIG. 4B are diagrams showing the parametric gain and the output power of the optical signal with respect to input power;

FIG. 5 is a diagram showing the input signal/output signal when the input power of the optical signal is smaller than the threshold power;

FIG. 8A-FIG. 8C are diagrams showing the first example;

DESCRIPTION OF THE PREFERRED EMBODIMENTS

Figure 2:
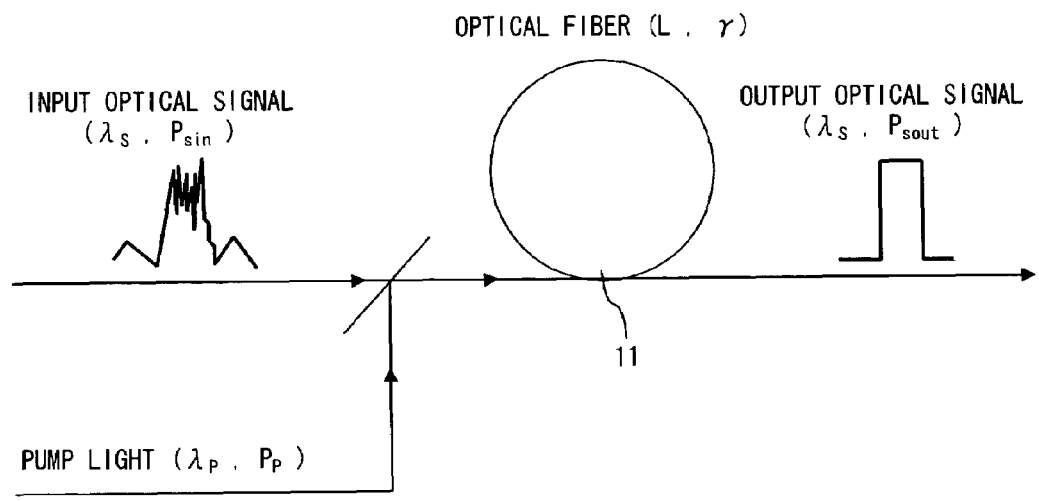
FIG. 2 is a diagram illustrating the operations of the optical waveform shaping apparatus of an embodiment of the preset invention.

FIG. 1 is a diagram illustrating an operation principle of an optical waveform shaping apparatus of the present invention. In FIG. 1, an optical signal and pump light (and their optical waves) are inputted to a nonlinear optical medium 1. Here, the wavelength of the optical signal input to the nonlinear optical medium 1 is "$\lambda_s$". The input power of the optical signal is "$P_s$ ($P_{s\text{-}in}$)". The wavelength of the pump light is "$\lambda_p$", which is different from the wavelength of the optical signal. The input power of the pump light is "$P_p$".

The input power of the optical signal and the input power of the pump light are controlled by a power controller, which is, for example, an optical amplifier. The wavelength of the optical signal output from the nonlinear optical medium 1 is "$\lambda_s$", which is the same as that of the optical signal input to the nonlinear optical medium 1. On the output side of the nonlinear optical medium 1, an optical band pass filter (for extracting a wavelength component of the optical signal from the optical output of the nonlinear optical medium 1) is provided as necessary.

If the nonlinear optical medium 1 is a third-order or a second-order nonlinear optical medium, either four-wave mixing (FWM) or three-wave mixing (TWM) occurs by the pump light in the nonlinear optical medium 1. This description assumes that the nonlinear optical medium 1 is a third-order nonlinear optical medium and that the optical signal is parametrically amplified in a polarization direction, which is approximately the same direction as the polarization direction of the pump light by the four-wave mixing. The gain of the parametric amplification increases approximately in proportion to the square of the pump light power $P_p$ ($P_p^2$), when the pump light power $P_p$ is sufficiently higher than the optical signal power $P_s$. However, if the optical signal power $P_s$ becomes large and the pump light power $P_p$ is not considered to be sufficiently larger than the optical signal power $P_s$, the power of the pump light consumed to cause the four-wave mixing becomes large. Then, a phenomenon called "depletion" occurs in which the pump light power $P_p$ is attenuated in the nonlinear optical medium 1. When the depletion of the pump light occurs in the nonlinear optical medium 1, the parametric gain in the nonlinear optical medium 1 reaches saturation drastically (i.e., the gain decreases). As a result, even if the input power of the optical signal is increased, the optical signal power output from the nonlinear optical medium 1 is limited to a certain level, and the parametric amplifier operates as a so-called optical limiter amplifier. In the optical limiter amplifier, the output power is constant even when the power of the input optical signal fluctuates. Therefore the optical waveform shaping which suppresses intensity noise in which the intensity of the optical signal is fluctuated (in particular, suppression of "1" level noise) is realized.

The nonlinear optical medium 1 is, for example, an optical fiber. In such a case, the zero-dispersion wavelength of the optical fiber may match or approximately match the wavelength $\lambda_p$ of the pump light. This configuration creates a favorable efficiency of the parametric amplification by the four-wave mixing. In addition, a configuration employing a highly nonlinear fiber (HNLF) having the nonlinear optical effect enhanced as the nonlinear optical medium 1 is effective. The highly nonlinear optical medium is realized by, for example, an optical fiber having the nonlinear refractive index enhanced by doping germanium or bismuth in the core, an optical fiber having the optical power density enhanced by designing a small mode field, or a photonic crystal fiber, among other methods. Furthermore, in other nonlinear optical media, it is possible to employ a semiconductor optical amplifier with quantum-well structure or a semiconductor optical amplifier with quantum-dot structure, and so forth.

As other devices have the above mentioned parametric amplification effect (a nonlinear optical medium), a medium may be used that effectively generates a second-order nonlinear optical effect such as three-wave mixing. In such a case, for example, a LiNbO$_3$ waveguide (PPLN) having quasi phase matching structure or a GaAlAs element can be employed.

It should be noted that when either the four-wave mixing or three-wave mixing occurs, the phase of the optical signal is not distorted in the nonlinear optical medium 1. For that reason, the waveform shaping method of the present invention is applicable to such signals as an optical phase modulated signal and an optical frequency modulated signal in addition to an optical intensity modulated signal.

The operations of the optical waveform shaping apparatus of the present invention are summarized as below:

(1) An optical signal (signal light beam) and pump light (control light) each having different wavelengths are input to a nonlinear optical medium. This generates four-wave mixing or three-wave mixing in the nonlinear optical medium and the optical signal is parametrically amplified by the pump light.

(2) The power of the optical signal input to the nonlinear optical medium is increased so that the parametric gain in the nonlinear optical medium either reaches saturation or starts to decrease. This enables the realization of the optical limiter operation and suppression of the "1" level fluctuation of the optical signal.

(3) By controlling the polarization states of the optical signal and the pump light, or by employing a saturable absorber, "0" level fluctuation of the optical signal is also suppressed. Note that the suppression of the "0" level fluctuation of the optical signal is not requisite in the present invention.

The above operations enable the realization of ultrahigh speed optical waveform shaping with both high efficiency and wide operating band. Additionally, improvement of the optical S/N ratio can be achieved.

In the following description, operations of the optical waveform shaping apparatus of an embodiment of the preset invention are set forth:

FIG. 2 is a diagram illustrating the operations of the optical waveform shaping apparatus of an embodiment of the preset invention. This embodiment uses, an optical fiber 11, a third-order nonlinear optical medium, as an example of the nonlinear optical medium 1 shown in FIG. 1. For purposes of this embodiment, assume that the wavelength of the optical signal $E_s$ is "$\lambda_s$", the frequency is "$\omega_s$", and the input power to the optical fiber 11 is "$P_s$". Further assume that the wavelength of the pump light $E_p$ is "$\lambda_p$", the frequency is "$\omega_p$", and the input power to the optical fiber 11 is "$P_p$". Note that the pump light may be continuous wave (CW) light, or may be an optical pulse train.

Figure 3A:
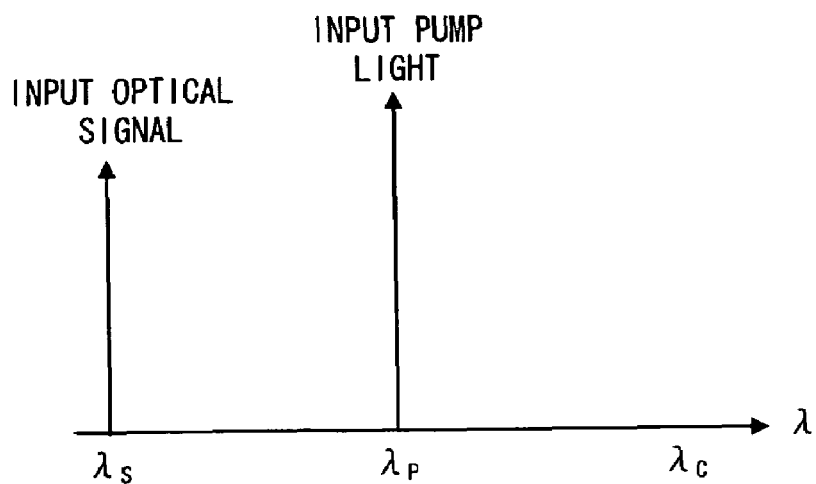
FIG. 3A and FIG. 3B are diagrams showing a relation between the optical signal and the pump light.

Both of the optical signal $E_s$ and the pump light $E_p$ are input to the optical fiber 11. At this time, the optical signal and the pump light are combined by an optical coupler and then input to the optical fiber 11. A wavelength allocation of the optical signal $E_s$ and the pump light $E_p$ is shown in FIG. 3A. The wavelength $\lambda_p$ of the pump light may be longer or shorter than the wavelength "$\lambda_s$" of the optical signal. The wavelength difference between them is not limited but, for example, several nm to several tens nm.

Figure 3B:
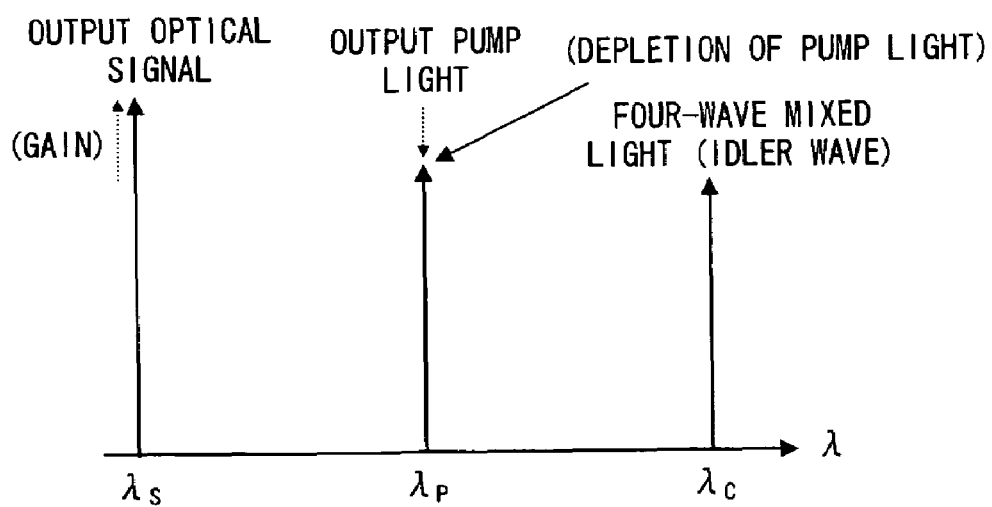

In the interaction between the optical signal $E_s$ and the pump light $E_p$, as shown in FIG. 3B, an idler wave $E_c$ (frequency: $\omega_c$) which corresponds to the optical signal $E_s$ is generated by four-wave mixing. The power of the optical signal $E_s$ and that of the idler wave $E_c$ are amplified (via parametric amplification) by the four-wave mixing. At this time, a portion of the energy of the pump light $E_p$ is almost evenly provided to the optical signal $E_s$ and the idler wave $E_c$.

Note that the frequencies of the optical signal, the pump light, and the idler wave should satisfy the following equation:

$$\omega_p - \omega_c = \omega_s - \omega_p \neq 0$$

It is given that the length of the optical fiber 11 is "L", and the loss is "α". Also given is that the polarization states of all light waves are equal, and phases match completely in the optical fiber 11. In addition, the input power $P_p(0)$ of the pump light $E_p$ is assumed to be sufficiently larger than the power $P_s$ of the optical signal $E_s$ and the power $P_c$ of the idler light $E_c$. In this description, "sufficiently larger" is defined as ten times larger (10 dB) or more, for example. Consequently, the optical signal $E_s$ output from the optical fiber 11 can acquire gain $G_s$ as shown in the following equation (1):

$$G_S = \exp(-\alpha L)[1 + \phi^2(L)] \quad (1)$$

$$\phi(L) = \gamma P_P(O) l(L) \quad (2)$$

$$\gamma = \frac{\omega n_2}{c A_{\mathit{eff}}} \quad (3)$$

Note that "φ(L)" represents nonlinear optical phase shift, "$P_p(0)$" represents input power of the pump light, "l=(1−e^{−αL})/αL" represents interaction length, "γ" represents third-order nonlinear constant, and "n2" and "$A_{\mathit{eff}}$" represents a nonlinear refractive index and an effective core cross-section area, respectively, in the optical fiber 11.

As shown in the above (1)-(3), the optical parametric gain $G_s$ increases in proportion to squared product of the nonlinear constant, the input power of the pump light, and the interaction length. In this example, the generation efficiency of the four-wave mixing is highly dependent on the polarization state of the interacting light waves. Specifically, when the polarization states of light waves inputted to the optical fiber 11 are the same, the generation efficiency of the four-wave mixing is maximized, but when the polarization states of the light waves are orthogonal to each other, the four-wave mixing hardly occurs. Thus, when the input power of the pump light $E_p$ is sufficiently large, the optical signal $E_s$ is parametrically amplified selectively in the same polarization state as that of the pump light $E_p$.

In the above model, a condition in which the power $P_p$ of the pump light $E_p$ is not considered to be sufficiently larger than the power $P_s$ of the optical signal $E_s$ and the power $P_c$ of the idler wave $E_c$ is created by increasing the input power $P_s$ of the optical signal $E_s$ inputted to the optical fiber 11. As a result, the parametric gain $G_s$ gradually reaches saturation (or starts to decrease). In particular, when in the "depletion" state, in which the pump light power is reduced in the optical fiber 11 as the power $P_p$ of the pump light $E_p$ is consumed for generation of the four-wave mixing, the parametric gain drastically reaches saturation or decreases.

FIG. 4A and FIG. 4B are diagrams showing the parametric gain and the output power of the optical signal with respect to input power. In this drawing, it is assumed that the input power of the pump light $E_p$ is constant.

When input power $P_{s-in}$ of the optical signal $E_s$ is small, the parametric gain $G_s$ is constant. Power $P_{s-out}$ of the optical signal outputted from the optical fiber 11 becomes larger as the input power $P_{s-in}$ increases. Note that in FIG. 4B, a dotted line represents the output power of the optical signal under the assumption that the parametric gain is zero, and a solid line represents the output power of the parametrically amplified optical signal.

When the input power $P_{s-in}$ of the optical signal exceeds a threshold power $P_1$, the parametric gains $G_s$ reaches saturation and starts to decrease, as shown in FIG. 4A. The output power of the optical signal $P_{s-out}$ approaches the state represented by the dotted line as shown in FIG. 4B.

Figure 6:
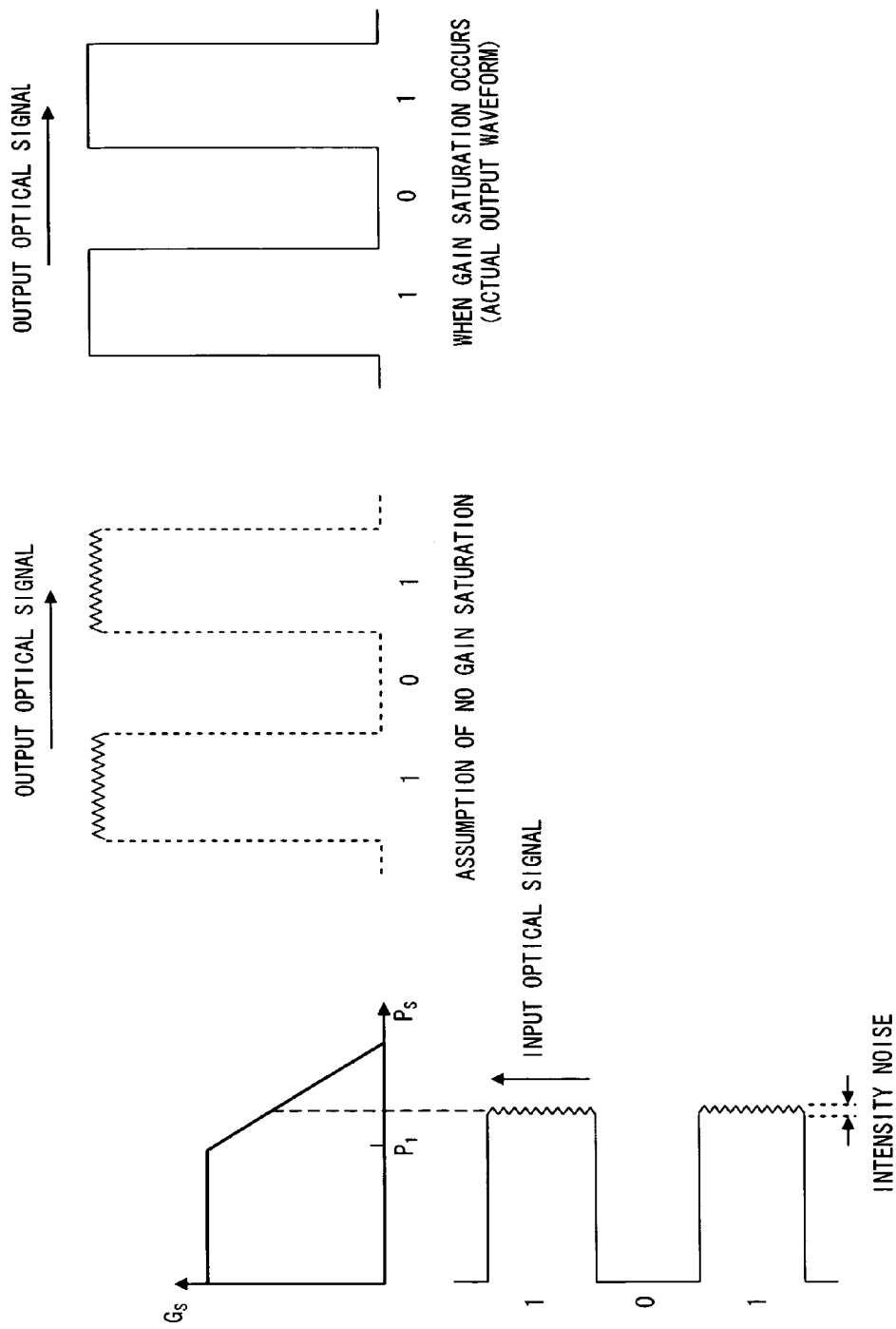
FIG. 6 is a diagram showing the input signal/output signal when the input power of the optical signal is larger than the threshold power.

FIG. 5 and FIG. 6 are diagrams explaining the relation between the gain saturation and waveform shaping. FIG. 5 schematically shows the waveform of the input signal/output signal when the input power of the optical signal is smaller than the threshold power $P_1$. In this case, since the parametric gain in the optical fiber 11 is not saturated, the output power of the optical signal is approximately proportional to the input power of the optical signal. If intensity noise is added to the input optical signal, the intensity noise is also amplified and outputted.

FIG. 6 schematically shows the waveform of the input signal/output signal when the input power of the optical signal is larger than the threshold power $P_1$. Note that in FIG. 6, the output waveform shown by a dotted line represents output power under the assumption that the gain was not saturated. The output waveform shown by a solid line represents output power when the gain saturation occurs, and it is the actual output waveform of the optical waveform shaping apparatus of the embodiment.

The parametric gain in the optical fiber 11 reaches saturation when the pump light enters the depletion state. Therefore, the output power of the optical signal is suppressed compared to the case that operates under the assumption that the gain was not saturated. In other words, in this case, the optical limiter function is performed. At the same time, the intensity noise of the "1" level of the optical signal is also suppressed. Thus, "1" level noise is removed and the waveform of the optical signal outputted from the optical fiber 11 is favorably shaped. Note that the output level in a case in which the input power of the optical signal exceeds the threshold power $P_1$ and the gain is saturated is basically higher than the output level in a case in which the input power of the optical signal is smaller than the threshold power $P_1$ and the gain is not saturated.

By utilizing the above phenomenon, the intensity noise of the optical signal may be suppressed. Note that the parametric amplification is an efficient amplification method which increases in proportion to the square of the pump light power, approximately. Thus, a configuration in which an optical signal is processed in the state in which the parametric gain is saturated is not favorable in general. In particular, a configuration in which the pump light is in depletion state has not been employed previously because gain efficiency is extremely reduced.

The optical waveform shaping apparatus of the embodiment of the present invention, however, introduces a configuration in which strong gain saturation (due to depletion of the pump light) is employed in order to achieve the optical limiter function. By so doing, a favorable waveform shaping effect can be obtained.

It should be noted that the waveform shaping circuits described in the Patent Document 1 and the Patent Document 2 provide the optical limiter function by utilizing four-wave mixing. However, those circuits do not use pump light for amplifying the optical signal, and thus they do not utilize "saturation of gain." In other words, the circuits reduce (i.e., limit) the power of the optical signal by transferring the power of the optical signal to probe light. Therefore, the optical limiter function of the Patent Documents is weak and the "1" level intensity noise may not be suppressed sufficiently.

Alternatively, the optical waveform shaping apparatus of an embodiment of the present invention operates under the premise of a configuration in which an optical signal is amplified by using pump light. The optical limiter function is realized by gain saturation due to the pump light depletion. The parametric gain, as represented in the above equations (1)-(3), depends on the square of an interaction length. Therefore, when the pump light enters a depletion state, the parametric gain is drastically reduced and sufficient optical limiter function can be obtained accordingly. For that reason, the optical waveform shaping apparatus of the embodiment can perform favorable waveform shaping.

Figure 7:
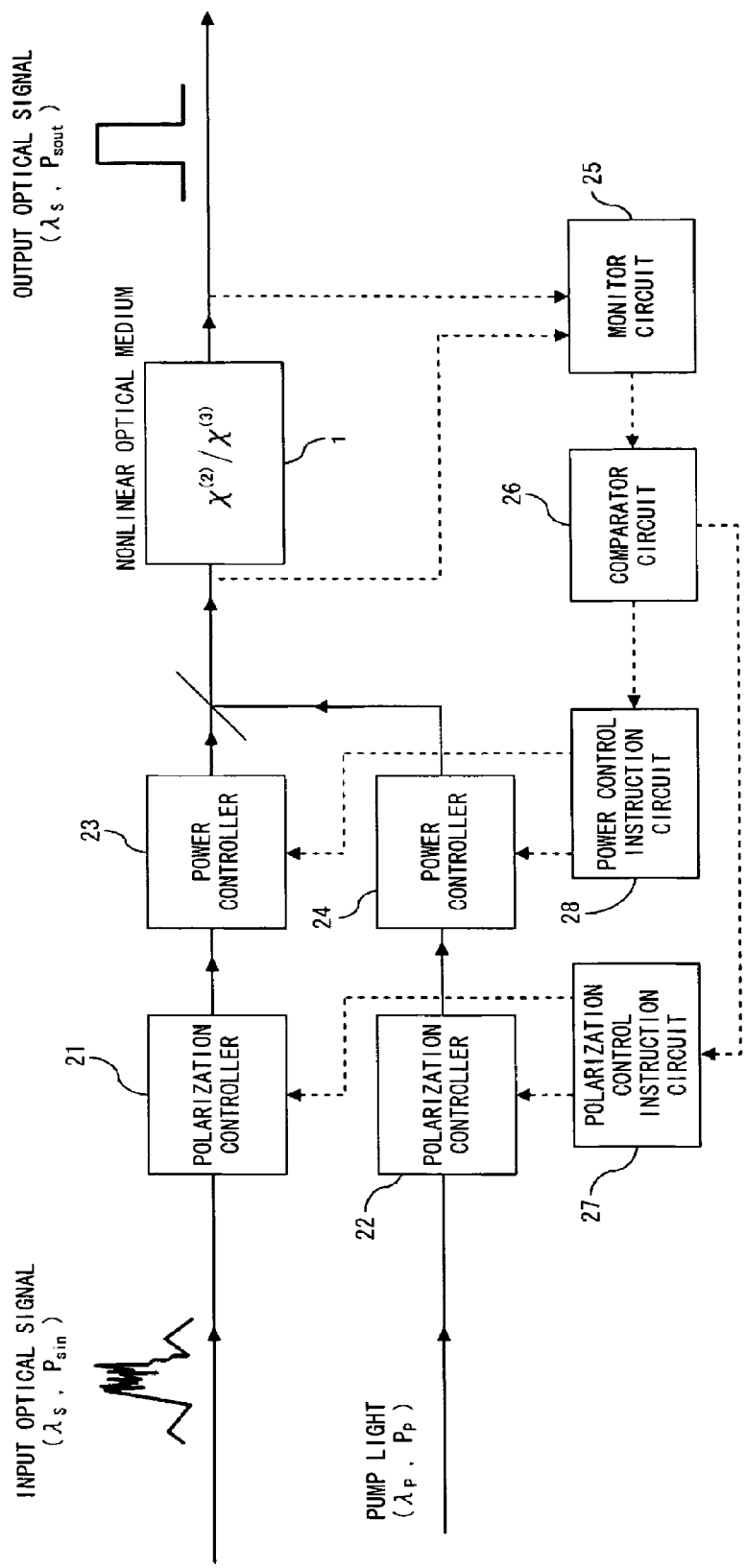
FIG. 7 is a diagram showing a specific configuration of the optical waveform shaping apparatus of an embodiment of the present invention.

FIG. 7 is a diagram showing a specific configuration of the optical waveform shaping apparatus of the embodiment of the present invention. Note that the nonlinear optical medium 1 is a second-order or third-order nonlinear optical medium ($\chi^{(2)}/\chi^{(3)}$) and it can be realized by the above optical fiber 11, for example.

A polarization controller 21 controls the polarization state of an input optical signal. A polarization controller 22 controls the polarization state of pump light. Note that each of the polarization controllers 21 and 22 controls the polarization state of the optical signal and the pump light in accordance with the instruction from a polarization control circuit 27. For the polarization controllers 21 and 22, for example, a wavelength-plate type polarization controller, a $LiNbO_3$ type polarization controller, a fiber sqeezing type polarization controller, a Faraday rotator, and other implements can be used.

A power controller 23 adjusts the power of the optical signal having the polarization state controlled by the polarization controller 21. A power controller 24 adjusts the power of the pump light having the polarization state controlled by the polarization controlled 22. Note that each of the power controllers 23 and 24 controls the power of the optical signal and the pump light in accordance with the instruction from a power control circuit 28. The power controllers 23 and 24 can be realized by, for example, an optical amplifier (or a combination of an optical amplifier and an optical attenuator), among others.

A monitor circuit 25 monitors the power of the optical signal inputted to the nonlinear optical medium 1 and the power of the optical signal output from the nonlinear optical medium 1. Note that the monitor circuit 25 detects the power of the optical signal input to the nonlinear optical medium 1 by receiving a part of the light wave (including the optical signal and the pump light) input to the nonlinear optical medium 1. In the same manner, the monitor circuit 25 detects the power of the optical signal output from the nonlinear optical medium 1 by receiving a part of the light wave (including the optical signal and the pump light) output from the nonlinear optical medium 1.

A comparator circuit 26 calculates a gain in the nonlinear optical medium 1 based on the input power and the output power of the optical signal. The comparator circuit 26 compares the input power and/or output power of the optical signal with a prescribed threshold, respectively, when necessary.

The polarization control instruction circuit 27 refers to the output of the comparator circuit 26, and issues instructions to adjust the polarization to the polarization controllers 21 and 22. The power control instruction circuit 28 refers to the comparator circuit 26, and issues instructions to adjust optical power to the power controllers 23 and 24.

It should be noted that the optical waveform shaping apparatus with the above configuration comprises a pump light source and an optical band pass filter, however they are not shown in the drawing. The pump light source generates the pump light (CW light beam or optical pulses). If the optical pulse is used as the pump light, a pulse train synchronized with a clock signal recovered from input optical signal may be generated, for example. The optical band pass filter is, for example, an optical wavelength filter having a transmission frequency that is the same as the wavelength of the optical signal and is provided to the subsequent stage of the nonlinear optical medium 1. The optical band pass filter extracts a wavelength component of the optical signal from the output of the nonlinear optical medium 1.

In the optical waveform shaping apparatus with the above configuration, the polarization controllers 21 and 22 and the power controllers 23 and 24 are adjusted in accordance with the following procedure.

First, the states of the polarization controllers 21 and 22 are adjusted. At this time, the polarization states of the optical signal and the pump light are adjusted so that the nonlinear optical effect is appropriately generated in the nonlinear optical medium 1. Note that the nonlinear optical effect (especially, four-wave mixing) occurs with the maximum efficiency when the polarization states of the optical signal and the pump light are identical. Therefore, the polarization controllers 21 and 22 may be controlled so that the polarization states of the optical signal and the pump light match each other. The present invention is not limited to this configuration; the polarization states of the optical signal and the pump light may be controlled so as to differ from each other.

Then the power control instruction circuit 28 adjusts the state of the power controller 24. In other words, the power of the pump light is controlled so that the desired or sufficient parametric gain can be obtained in the nonlinear optical medium 1. At that time, the input power of the optical signal is small, and the power of the pump light is significantly larger than the input power of the optical signal. Specifically, the assumed state is such that the parametric gain approximately follows the above equation (1), for example.

Afterwards, the input power of the optical signal is increased while monitoring the parametric gain in the nonlinear optical medium 1. At this point, while the input power of the optical signal is smaller than the threshold power $P_1$ shown in FIG. 4A, the parametric gains is approximately constant. However, when the input power of the optical signal is increased and becomes larger than the threshold power $P_1$, the parametric gain reaches saturation and starts to decrease. The power control instruction circuit 28 ends the adjustment of the power controller 23 at the point in time when the parametric gain is reduced by a prescribed level.

It should be noted that in the above adjustment procedures, the extent to which the parametric gain should be reduced depends on the required level of the optical limiter function (i.e. waveform shaping function). For example, in a system, in which the waveform of an input optical signal is estimated to be relatively favorable, slight reduction of the parametric gain may be sufficient, putting a high priority on efficiency of the gain rather than on the waveform shaping effect. On the other hand, in a system in which the waveform of an input optical signal is estimated to be considerably degraded, the parametric gain may be reduced significantly in order to obtain sufficient waveform shaping effect.

The adjustment of the input power of the optical signal can be performed based on the power of the pump light output from the nonlinear optical medium 1. Here, the optical limiter function for waveform shaping of the present invention is realized when the pump light is in the depletion state. Thus, by monitoring reduction of the power of the pump light output from the nonlinear optical medium 1 in a process where the input power of the optical signal is increased while maintaining the input power of the pump light at a constant level, the waveform shaping can be performed in the same manner as monitoring the parametric gain.

In the following description, various usage examples of the optical waveform shaping apparatus of the embodiment of the present invention are set forth.

First Example

In the first example, the optical waveform shaping apparatus of the present invention is applied to an optical switch having an amplification function. This kind of optical switch is, for example, realized by providing a polarizer in the subsequent stage of the nonlinear optical medium 1 of the optical waveform shaping apparatus shown in FIG. 7.

FIG. 8A-FIG. 8C are diagrams explaining operations of the optical switch of the first example. In the following description, assume that the optical signal $E_s$ (wavelength: $\lambda_s$, peak power: $P_s$) and optical control pulse $E_p$ (wavelength: $\lambda_p$, peak power: $P_p$) serving as the pump light, are input to an optical fiber (HNLF) 31 serving as the nonlinear optical medium.

In the subsequent stage of the optical fiber 31, a polarizer 32 is provided. A linear polarization component in a direction of the polarization main axis of the polarizer 32 alone in the optical signal output from the optical fiber 31 is transmitted through the polarizer 32.

The polarization state of the optical signal $E_s$ is controlled, as shown in FIG. 8A, so as to be orthogonal to the polarization main axis of the polarizer 32 at the input side of the optical fiber 31. By so controlling, in a time domain where the optical control pulse $E_p$ is absent, as shown in FIG. 8B, the polarization state of the optical signal $E_s$ does not change in the optical fiber 31. In such a case, the polarization direction of the optical signal $E_s$ output from the optical fiber 31 is still orthogonal to the polarization main axis of the polarizer 32. Hence, in this case, the optical signal $E_s$ is blocked by the polarizer 32.

The polarization of the optical control pulse $E_p$, as shown in FIG. 8B and FIG. 8C, is controlled so as to be linear polarization at angle of 40-50 degrees (preferably 45 degrees) with respect to the polarization of the optical signal $E_s$. In such a case, in a time domain where the optical control pulse $E_p$ is present, the polarization state of the optical signal $E_s$ changes by influence of the optical control pulse $E_p$ in the optical fiber 31. At that time, assume that peak power $P_p$ of the optical control pulse $E_p$ is sufficiently larger than the power $P_s$ of the optical signal $E_s$. Then, the optical signal $E_s$ is parametrically amplified in a polarization direction of the optical control $E_p$ in the optical fiber 31. In other words, the optical signal $E_s$ output from the optical fiber 31 includes a large polarization component in a direction of the polarization main axis of the polarizer 32. Therefore, in a time domain where the optical control pulse $E_p$ is present, a part of the components of the optical signal $E_s$ is transmitted through the polarizer 32. As above, the optical signal $E_s$ is switched according to the presence or absence of the optical control $E_p$.

Four-wave mixing (parametric amplification) occurs selectively for the optical signal having the same polarization components as the pump pulse. For that reason, when the pump light power becomes larger to a certain extent, the polarization state of the optical signal approaches to 45 degree direction, which is the same as the pump pulse.

Switching between ON and OFF of the optical signal is possible without wavelength conversion in the optical switch having the above configuration. "OFF (zero)" level is blocked to an adequately low level by the polarizer 32, and at the same time, "ON (1)" level is output having a large gain by the parametric amplification effect. Accordingly, a high-performance optical switch having a high extinction ratio of 30 dB or higher and a favorable optical S/N ratio can be realized. In the above optical switch, the polarization direction of the pump light changes by about 45 degrees with respect to the polarization direction of the optical signal. Consequently, 3 dB loss is generated in the polarizer 32; however, by obtaining the parametric gain, which can be larger than that loss, optical switching with substantial gain can be achieved. Hence, when the parametric gain is strongly saturated by increasing the input power of the optical signal to a level larger than the threshold power, waveform shaping for suppressing intensity noise of ON level can be achieved. In addition, fluctuation and noise of the OFF level can be suppressed by the polarizer 32, and therefore, an optical 2R (Regeneration and Reshaping) effect can be realized.

Since the response time of the four-wave mixing in an optical fiber is extremely high-speed (femtosecond range), the optical waveform shaping apparatus of the embodiment can shape the waveform of an ultrahigh speed optical signal of several tera bits per second (Tb/s).

Second Example

Figure 9:
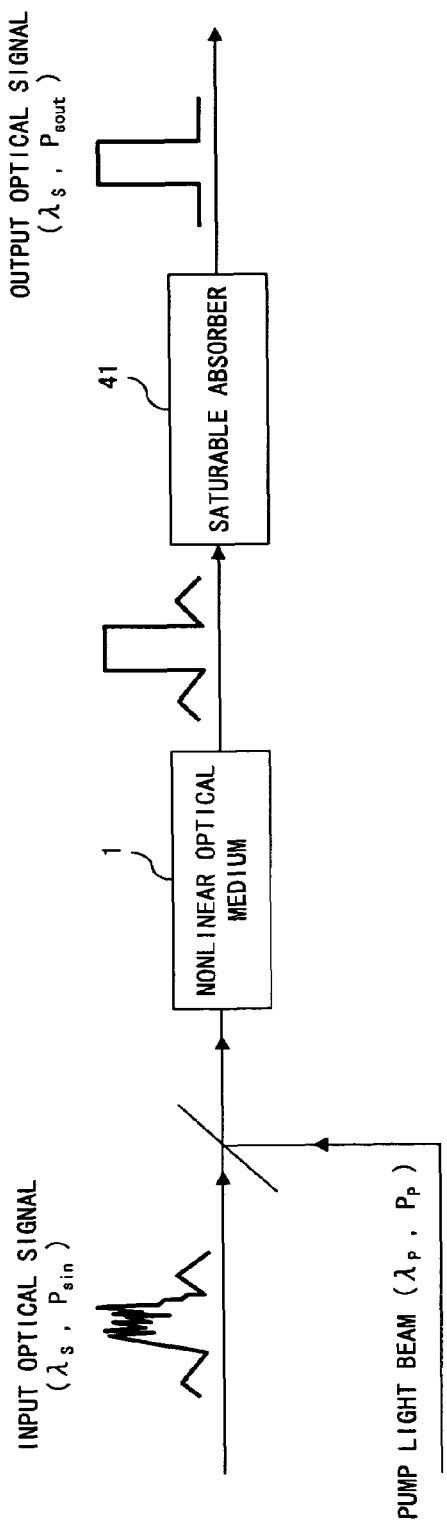
FIG. 9 is a diagram showing the second example.

The optical waveform shaping apparatus of the second example comprises a saturable absorber 41 in the previous or subsequent stage of the nonlinear optical medium 1 of the above waveform shaping apparatus, as shown in FIG. 9. The saturable absorber 41 suppresses the OFF level fluctuation of an optical signal. Note that the saturable absorber 41 can be realized by a semiconductor amplifier, a Mach-Zehnder interferometer optical fiber switch, a nonlinear optical loop mirror (NLOM) switch, or similar means, for example.

Third Example

One of the causes of quality deterioration of a phase-modulated optical signal or a frequency-modulated optical signal is such that intensity noise (and intensity fluctuation) is converted into phase noise by the nonlinear optical effect in an optical fiber. Therefore, suppression of the intensity noise (and intensity fluctuation) of an optical signal by using the optical waveform shaping apparatus of the present invention is effective for quality improvement of a phase-modulated optical signal or a frequency-modulated optical signal.

Figure 10:
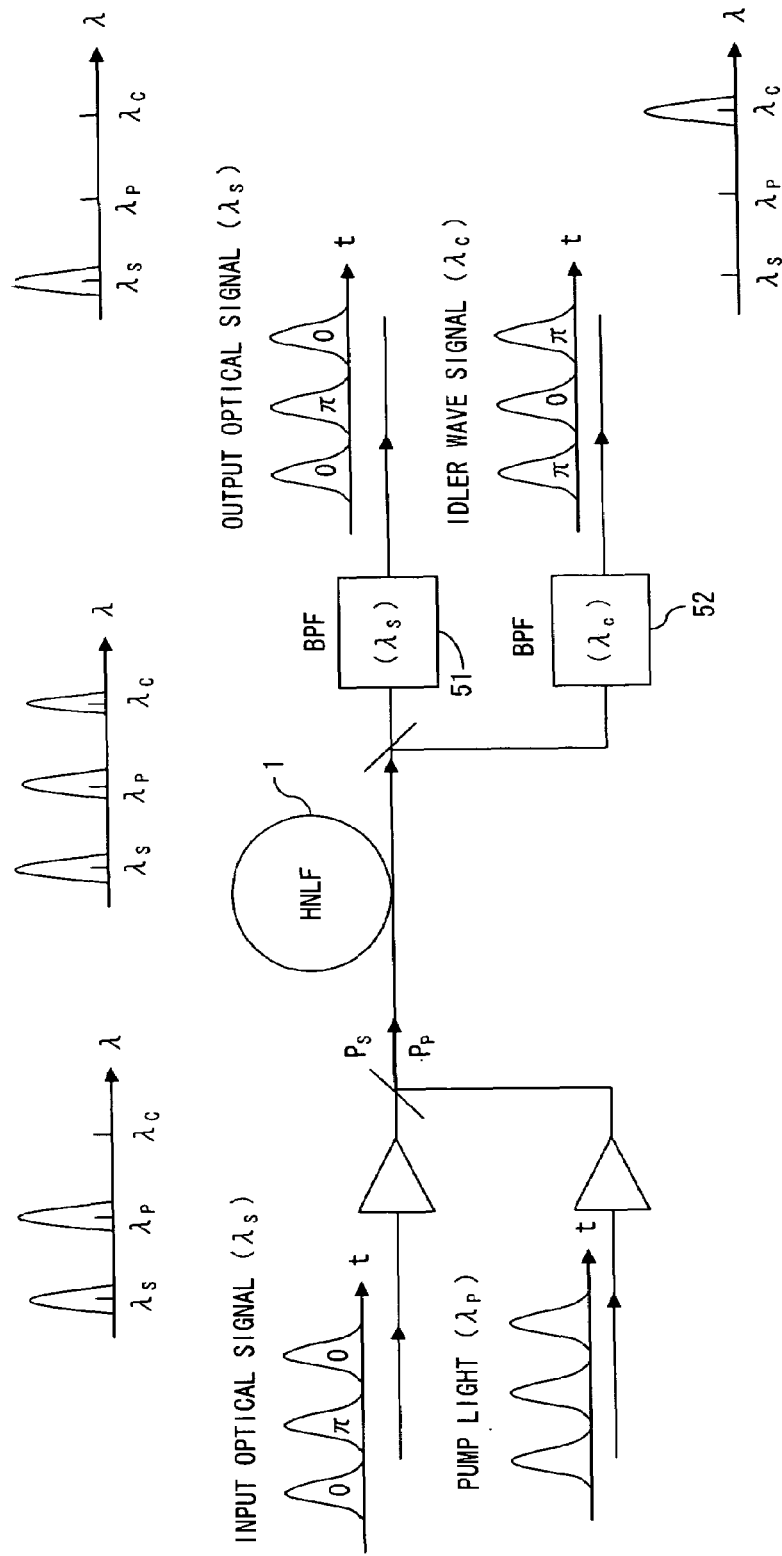
FIG. 10 is a diagram showing the third example.

FIG. 10 is an example where the optical waveform shaping apparatus of the present invention is applied to a communication apparatus for optical communication system (e.g. an optical receiver or optical repeater). In this example, a system in which an optical DPSK signal is transmitted via an optical fiber transmission path is introduced. Assume that the optical wavelength of the optical DPSK signal is "$\lambda_s$".

In the communication apparatus, an optical DPSK signal and pump light are input to the above nonlinear optical medium 1. Then, an idler wave (four-wave mixing light) having the wavelength $\lambda_c$ is generated by four-wave mixing in the nonlinear optical fiber 1. Here, phase of the optical DPSK signal (zero/$\pi$) and phase of the idler wave ($\pi$/zero) are inverted from each other.

The optical output (including the optical DPSK signal and an idler wave) is split by an optical splitter, and one portion is guided to an optical band pass filter 51 and the other portion is guided to an optical band pass filter 52. The optical band pass filter 51 transmits a frequency component $\lambda_s$. That is, the optical DPSK signal is obtained from the output of the optical band pass filter 51. Alternatively, the optical band pass filter 52 transmits a frequency component $\lambda_c$. That is, an idler wave signal is obtained from the output of the optical band pass filter 52. Consequently, by detecting (or demodulating) the optical DPSK signal or the idler wave, transmitted information can be recovered.

It should be noted that FIG. 10 shows a configuration using a pulse train synchronized with an optical DPSK signal as pump light; however, the present invention is not limited to the configuration. A continuous wave beam with high power sufficient to obtain a desired parametric gain may be used as the pump light.

Fourth Example

Figure 11:
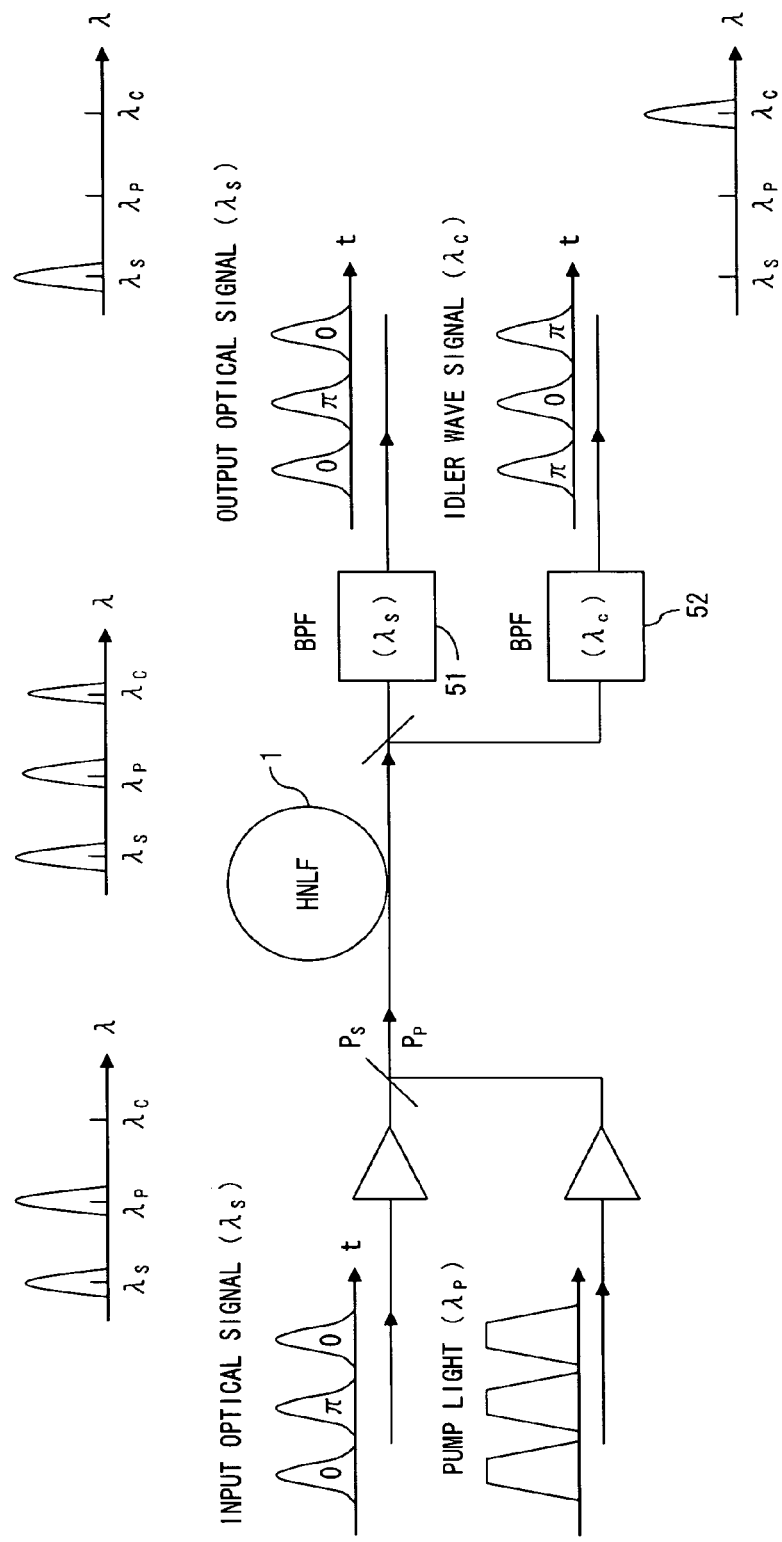
FIG. 11 is a diagram showing the fourth example.

In the configuration similar to that of the third example, as shown in FIG. 11, an optical pulse train having flattened-top shape may be used as pump light.

When generating the four-wave mixing by using the power of the pump light pulse in an optical fiber, an input optical signal is applied with an optical phase modulation by cross phase modulation (XPM). The intensity of the cross phase modulation is proportional to the peak intensity of the pump light. For that reason, if the pump light is a short pulse with a large peak, there is a probability that the optical phase of the optical signal is disturbed. In view of such a probability, the configuration of the fourth example uses a pump light pulse train with flattened-top shape as pump light. In a time domain where the power of the pump light is constant, influence of the cross phase modulation is maintained at a constant level, and as a result, the optical phase disturbance can be suppressed.

Fifth Example

Figure 12:
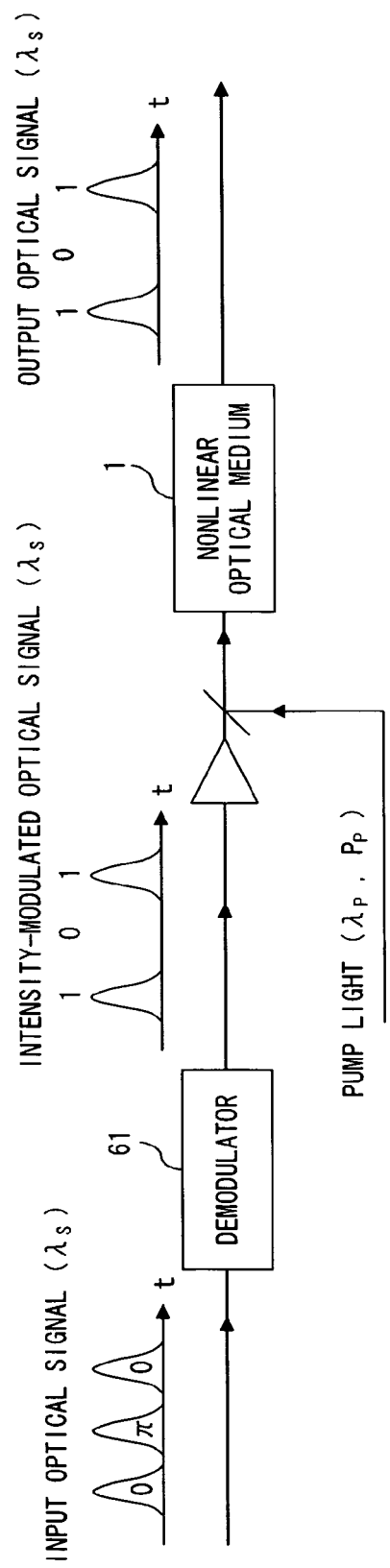
FIG. 12 is a diagram showing the fifth example.

In an optical receiver (or an optical repeater) receiving a phase-modulated optical signal or a frequency-modulated optical signal, as shown in FIG. 12, a demodulator 61 for converting the optical signal into an intensity-modulated optical signal (i.e. ON/OFF-modulated optical signal) may be provided in the previous stage of the optical waveform shaping apparatus of the present invention. According to this configuration, the phase-modulated optical signal or the frequency-modulated optical signal is shaped after being converted into an intensity-modulated optical signal.

Figure 13A:
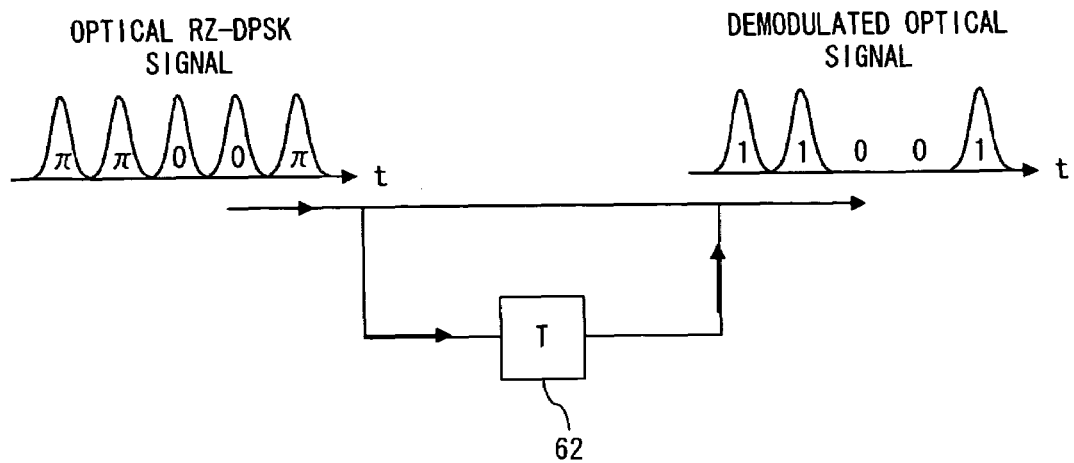
FIG. 13A and FIG. 13B are examples of the demodulator.
Figure 13B:
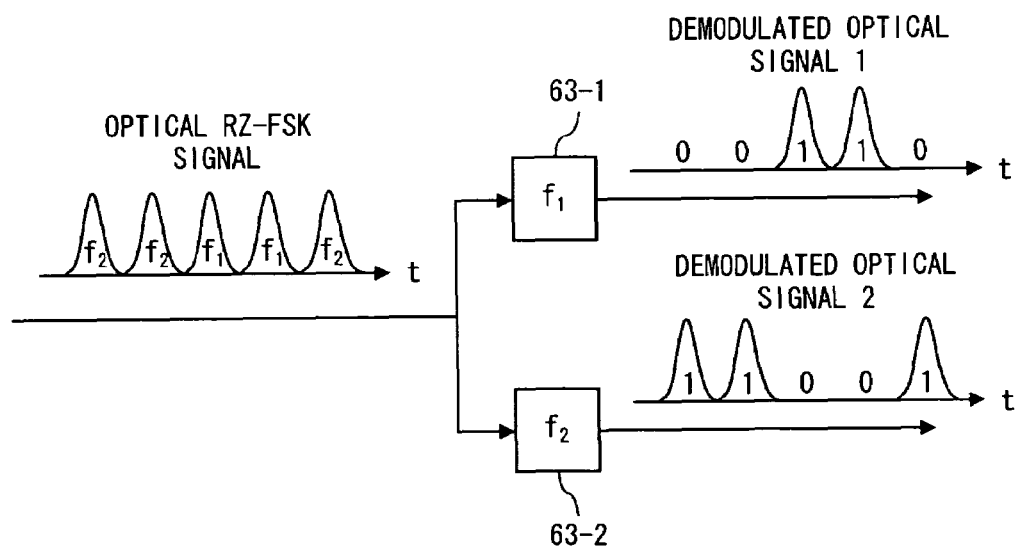

A demodulator for converting an optical DPSK signal into an intensity-modulated optical signal, as shown in FIG. 13A, can be realized by using a 1-bit delay element 62. A demodulator for converting an optical FSK signal into an intensity-modulated optical signal, as shown in FIG. 13B, can be realized by using a band pass filter 63-1 having a transmission frequency $f_1$ and a band pass filter 63-2 having a transmission frequency $f_2$. Note that the optical FSK signal shown in FIG. 13B is such that each of the frequencies $f_1$ and $f_2$ is assigned to "1" or "0".

It should be noted that details of the configurations in the first, third, forth, and fifth examples are described in Japanese Patent Application No. 2005-200572, which is in the name of the same applicant as the present patent application.

Sixth Embodiment

Figure 14:
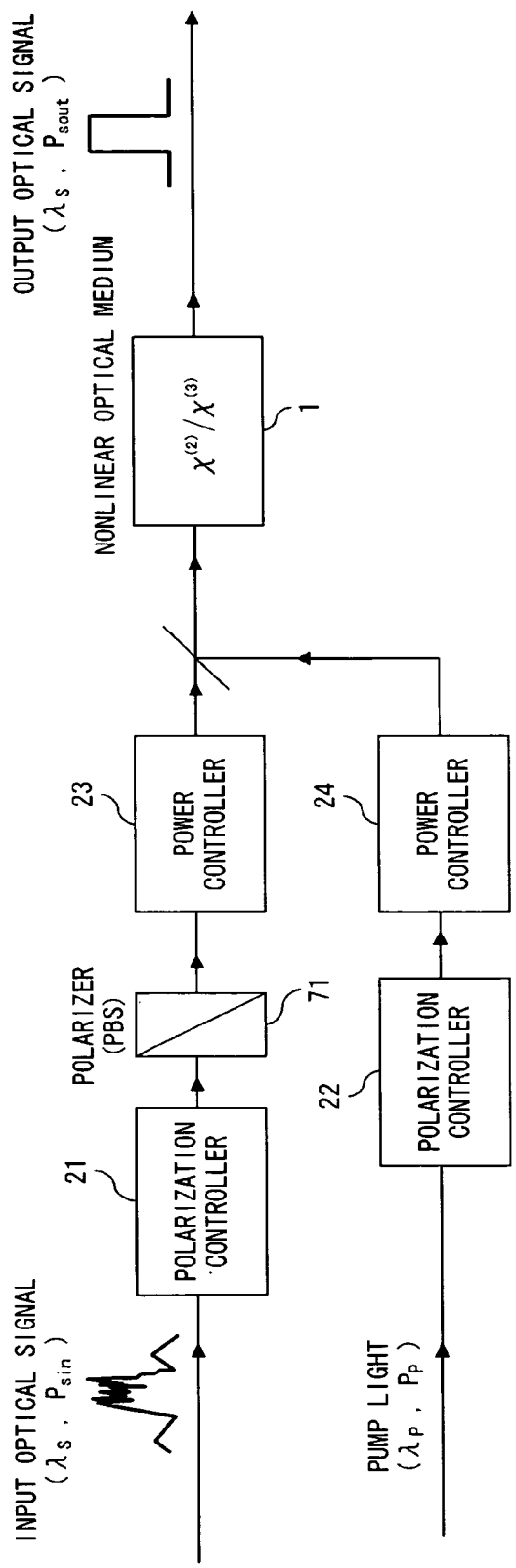
FIG. 14 is a diagram showing the sixth example.

A configuration for waveform shaping without depending on the polarization state of an input optical signal is shown in FIG. 14. In FIG. 14, a polarization of the input optical signal is fixed at an arbitrary polarization (e.g., linear polarization or elliptical polarization) by the polarization controller 21. In other words, fluctuation of the polarization of the input optical signal is removed. The power controller 23 controls the power of the optical signal with the fixed polarization. In the same manner, a polarization of the pump light is fixed by the polarization controller 22, and the power is controlled by the power controller 24. The polarization of the pump light may be the same as, or may be different from, that of the optical signal. Note that control of the polarization controllers 21 and 22 and the power controllers 23 and 24 is based on the procedures explained with reference to FIG. 7. However, in the sixth embodiment, a polarizer 71 (or PBS: Polarizing Beam Splitter) is provided between the polarization controller 21 and the power controller 23. A control system not shown in the drawing monitors the output power of the polarizer 71. In such a configuration, the polarization controller 21 may be adjusted so as to maximize the output power of the polarizer 71.

Seventh Embodiment

Figure 15:
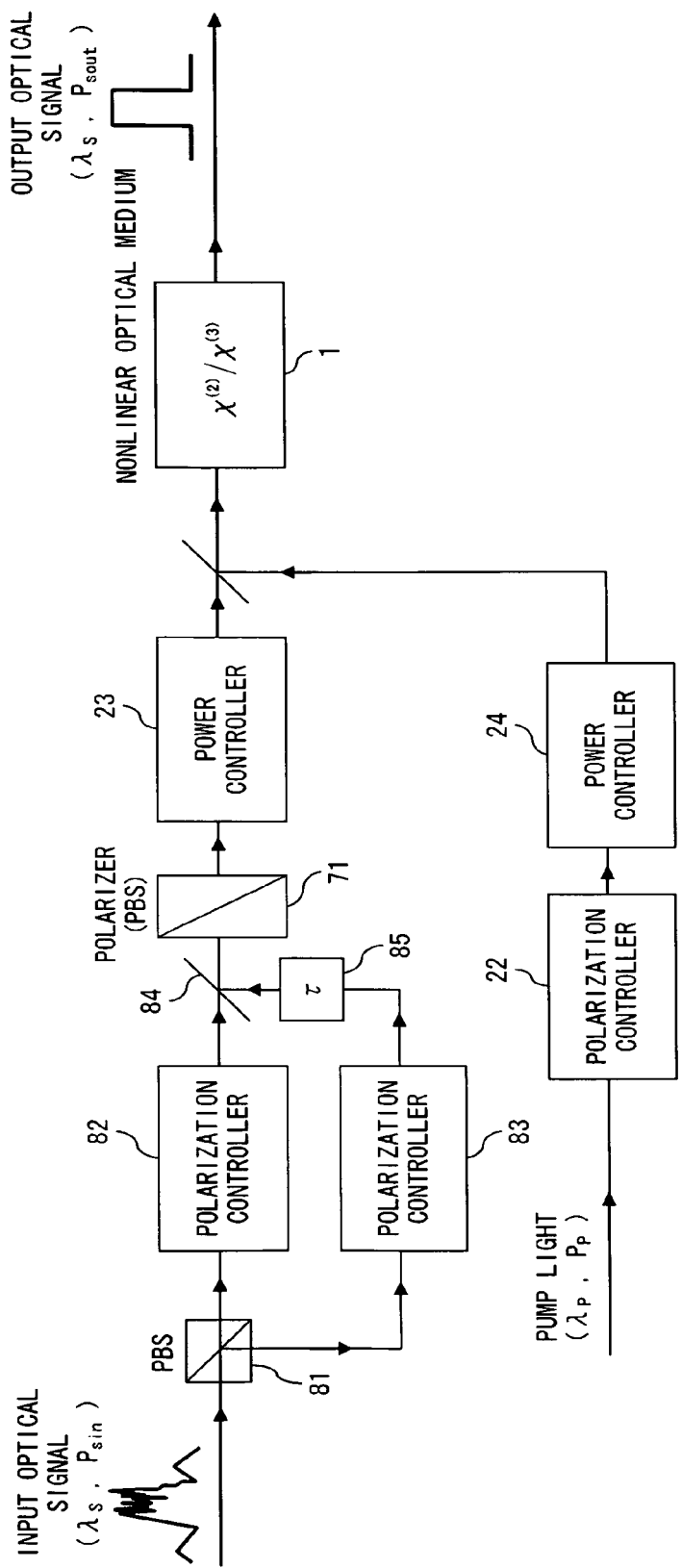
FIG. 15 is a diagram showing the seventh example.

A configuration designed to be independent of the polarization state of an input optical signal in a method that differs from that of the sixth example is set forth in FIG. 15. This optical waveform shaping apparatus avoids dependency on the polarization state of an input optical signal by using polarization diversity.

PBS 81 splits an input optical signal into a pair of polarization components orthogonal to each other. The pair of the polarization components is incident to polarization controllers 82 and 83. The polarization controllers 82 and 83 convert each polarization component into linear polarizations in the same direction. A optical coupler 84 combines power the pair of linear polarizations output from the polarization controllers 82 and 83 and directs the combined component to the power controller 23. For combining the power, an optical circuit 85 for time adjustment may be provided in order to match the timing of the pair of linear polarization as necessary. The optical circuit 85 can be realized by an optical delay element or a Faraday rotator, for example. Note that controls of the polarization controllers 82, 83, and 22, and power controllers 23 and 24 are basically the same as the procedures explained with reference to FIG. 7.

What is claimed is:

1. An optical waveform shaping apparatus, comprising:
    a first power controller for controlling power of an optical signal;
    a second power controller for controlling power of pump light having a wavelength different from the wavelength of the optical signal;
    a nonlinear optical medium to which the optical signal with power controlled by said first power controller and the pump light with power controlled by said second power controller is being input; and
    a monitor unit configured for monitoring input power of the optical signal input to said nonlinear optical medium and output power of the optical signal output from said nonlinear optical medium, wherein
    said first power controller configured to increase power of the optical signal until a gain in said nonlinear optical medium calculated from the input power and output power of the optical signal starts decreasing so that a gain of parametric amplification by the pump light is saturated in said nonlinear optical medium.

2. The optical waveform shaping apparatus according to claim 1, wherein
    said second power controller configured to set the gain at a certain value by controlling the power of the pump light, and
    said first power controller configured to increase the power of the optical signal so that the gain set at a certain value by said second power controller is decreased.

3. The optical waveform shaping apparatus according to claim 1, further comprising:
- a polarizer provided on an output side of said nonlinear optical medium;
- a first polarization controller, provided on an input side of said nonlinear optical medium, configured for controlling a polarization direction of the optical signal to be orthogonal to a polarization main axis of said polarizer; and
- a second polarization controller, provided on an input side of said nonlinear optical medium, configured for controlling a polarization direction of the pump light at a certain angle with respect to a polarization direction of the optical signal, wherein
- the optical signal is parametrically amplified in a polarization direction approximately the same as the polarization direction of the pump light in said nonlinear optical medium.

4. The optical waveform shaping apparatus according to claim 1, further comprising an optical band pass filter configured for transmitting a wavelength component of the optical signal on an output side of said nonlinear optical medium.

5. The optical waveform shaping apparatus according to claim 1, further comprising a saturable absorber on an input side or output side of said nonlinear optical medium.

6. The optical waveform shaping apparatus according to claim 1, wherein
- the optical signal is a phase-modulated optical signal or a frequency-modulated optical signal.

7. The optical waveform shaping apparatus according to claim 6, further comprising a demodulator, provided on an input side of said nonlinear optical medium, configured for converting the phase-modulated optical signal or the frequency-modulated optical signal into an intensity-modulated optical signal, wherein
- the intensity-modulated optical signal from said demodulator is input to said nonlinear optical medium.

8. The optical waveform shaping apparatus according to claim 1, further comprising an optical band pass filter configured for extracting a wavelength component, which is the same as the optical signal from output light of said nonlinear optical medium, or a wavelength component, which is the same as a wavelength of an idler wave corresponding to the optical signal.

9. The optical waveform shaping apparatus according to claim 1, wherein
- the pump light is an optical pulse with a flattened-top shape.

10. The optical waveform shaping apparatus according to claim 1, wherein
- said nonlinear optical medium is an optical fiber, and an average zero-dispersion wavelength matches or approximately matches a wavelength of the pump light.

11. The optical waveform shaping apparatus according to claim 10, wherein
- the optical fiber is a highly nonlinear optical fiber with a small mode field.

12. The optical waveform shaping apparatus according to claim 10, wherein
- the optical fiber is a highly nonlinear optical fiber having a core doped with germanium or bismuth.

13. The optical waveform shaping apparatus according to claim 10, wherein
- the optical fiber is a photonic crystal fiber.

14. The optical waveform shaping apparatus according to claim 1, wherein
- said nonlinear optical medium is a $LiNbO_3$ waveguide having a quasi-phase matching structure.

15. The optical waveform shaping apparatus according to claim 1, further comprising:
- a first polarization controller, provided on an input side of said first power controller, configured for fixing a polarization of the optical signal; and
- a second polarization controller, provided on an input side of said second power controller, configured for fixing a polarization of the pump light.

16. The optical waveform shaping apparatus according to claim 1, comprising on an input side of said first power controller:
- a splitter for splitting the optical signal into a pair of polarization components orthogonal to each other;
- a pair of polarization controllers for converting the pair of polarization components into a pair of linear polarizations in the same direction; and
- an optical coupler for combining the pair of linear polarizations, wherein
- the optical signal output from said optical coupler is incident to said first power controller.

17. An optical communication apparatus used in an optical communication system comprising the optical waveform shaping apparatus according to claim 1, wherein
- said optical waveform shaping apparatus configured to shape a waveform of an optical signal input via a first optical fiber and outputs the shaped optical signal to a second optical fiber.

18. An optical waveform shaping method comprising:
- inputting an optical signal and pump light having a wavelength different from the wavelength of the optical signal to a nonlinear optical medium;
- monitoring a gain of parametric amplification by the pump light based on input power of the optical signal input to the nonlinear optical medium and output power of the optical signal output from the nonlinear optical medium;
- adjusting power of the pump light to obtain a desired gain; and
- increasing power of the optical signal until the gain is saturated or decreased.

19. An optical waveform shaping apparatus, comprising:
- first power control means for controlling power of an optical signal;
- second power control means for controlling power of pump light having a wavelength different from the wavelength of the optical signal;
- a nonlinear optical medium to which the optical signal with power controlled by the first power control means and the pump light with power controlled by the second power control means being input; and
- monitor means for monitoring input power of the optical signal input to said nonlinear optical medium and output power of the optical signal output from said nonlinear optical medium, wherein
- the first power control means increases power of the optical signal until a gain in the nonlinear optical medium calculated from the input power and output power of the optical signal starts decreasing so that a gain of parametric amplification by the pump light is saturated in the nonlinear optical medium.

20. The optical waveform shaping apparatus according to claim 19, wherein
- the second power control means sets the gain at a certain value by controlling the power of the pump light, and the first power control means increases the power of the optical signal so that the gain set at a certain value by the second power control means is decreased.

21. The optical waveform shaping apparatus according to claim 19, further comprising:
a polarizer provided on an output side of the nonlinear optical medium;
first polarization control means, provided on an input side of the nonlinear optical medium, for controlling a polarization direction of the optical signal to be orthogonal to a polarization main axis of the polarizer; and
second polarization control means, provided on an input side of the nonlinear optical medium, for controlling a polarization direction of the pump light at a certain angle with respect to a polarization direction of the optical signal, wherein
the optical signal is parametrically amplified in a polarization direction approximately the same as the polarization direction of the pump light in the nonlinear optical medium.

22. The optical waveform shaping apparatus according to claim 19, further comprising optical band pass filter means for transmitting a wavelength component of the optical signal on an output side of the nonlinear optical medium.

23. The optical waveform shaping apparatus according to claim 19, further comprising a saturable absorber on an input side or output side of the nonlinear optical medium.

24. The optical waveform shaping apparatus according to claim 19, wherein
the optical signal is a phase-modulated optical signal or a frequency-modulated optical signal.

25. The optical waveform shaping apparatus according to claim 24, further comprising demodulating means, provided on an input side of the nonlinear optical medium, for converting the phase-modulated optical signal or the frequency-modulated optical signal into an intensity-modulated optical signal, wherein
the intensity-modulated optical signal from the demodulating means is input to the nonlinear optical medium.

26. The optical waveform shaping apparatus according to claim 19, further comprising optical band pass filter means for extracting a wavelength component, which is the same as the optical signal from output light of the nonlinear optical medium, or a wavelength component, which is the same as a wavelength of an idler wave corresponding to the optical signal.

27. The optical waveform shaping apparatus according to claim 19, wherein
the pump light is an optical pulse with a flattened-top shape.

28. The optical waveform shaping apparatus according to claim 19, wherein
the nonlinear optical medium is an optical fiber, and an average zero-dispersion wavelength matches or approximately matches a wavelength of the pump light.

29. The optical waveform shaping apparatus according to claim 28, wherein
the optical fiber is a highly nonlinear optical fiber with a small mode field.

30. The optical waveform shaping apparatus according to claim 28, wherein
the optical fiber is a highly nonlinear optical fiber having a core doped with germanium or bismuth.

31. The optical waveform shaping apparatus according to claim 28, wherein
the optical fiber is a photonic crystal fiber.

32. The optical waveform shaping apparatus according to claim 19, wherein
the nonlinear optical medium is a $LiNbO_3$ waveguide having a quasi-phase matching structure.

33. The optical waveform shaping apparatus according to claim 19, further comprising:
first polarization control means, provided on an input side of the first power control means, for fixing a polarization of the optical signal; and
second polarization control means, provided on an input side of the second power control means, for fixing a polarization of the pump light.

34. The optical waveform shaping apparatus according to claim 19, comprising on an input side of the first power control means:
splitting means for splitting the optical signal into a pair of polarization components orthogonal to each other;
a pair of polarization control means for converting the pair of polarization components into a pair of linear polarizations in the same direction; and
optical combining means for combining the pair of linear polarizations, wherein
the optical signal output from the optical combining means is incident to the first power control means.

35. An optical communication apparatus used in an optical communication system comprising the optical waveform shaping apparatus according to claim 19, wherein
the optical waveform shaping apparatus shapes a waveform of an optical signal input via a first optical fiber and outputs the shaped optical signal to a second optical fiber.

* * * * *